Figure 1:
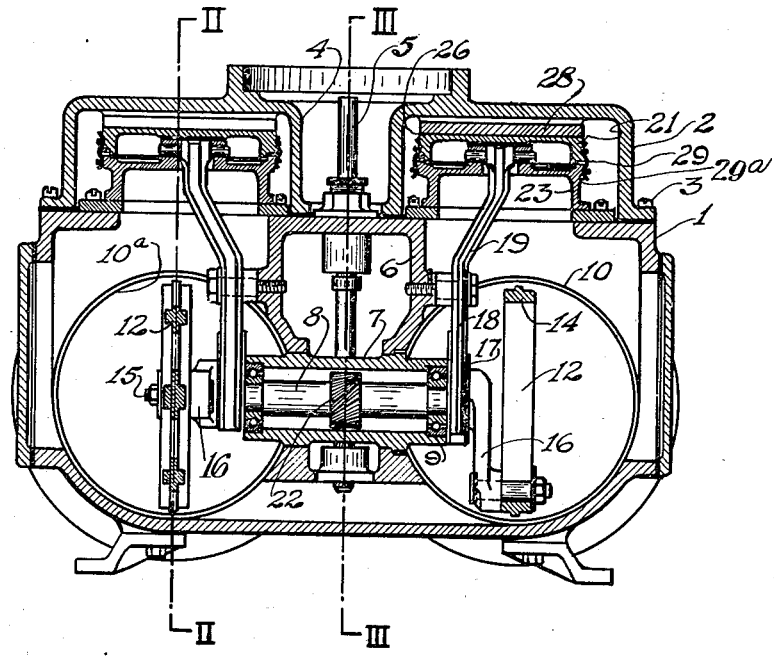

July 28, 1936.　　　　　L. McCANDLESS　　　　　2,049,307

BULK METER

Original Filed Feb. 3, 1933　　2 Sheets-Sheet 1

INVENTOR
Lyon McCandless
by William B. Jasper
Attorney.

Patented July 28, 1936

2,049,307

UNITED STATES PATENT OFFICE 2,049,307

BULK METER

Lyon McCandless, Beaver Falls, Pa.

Application February 3, 1933, Serial No. 655,055
Renewed June 8, 1936

6 Claims. (Cl. 73—245)

This invention relates to fluid meters and more particularly meters commonly referred to in the trade as bulk meters such as may be employed on pipe lines at refineries and at bulk handling stations.

It is among the objects of the invention to provide a meter construction in which the flow control valve is actuated by mechanism connected through the discharge side of the meter whereby the need for fluid packings is dispensed with and the operating mechanism is greatly simplified by the elimination of parts.

A further object of the invention is the provision of a mechanical linkage connecting the valve and measuring pistons in such manner that the timing of the valve is positively controlled in relation to the piston movements.

Another object of the invention is the provision of piston valves for fluid meters which are especially adapted for high pressure use as such valves are pressure balanced on all sides which is not the case in the more commonly utilized slide or rotary valves.

Figure 2:
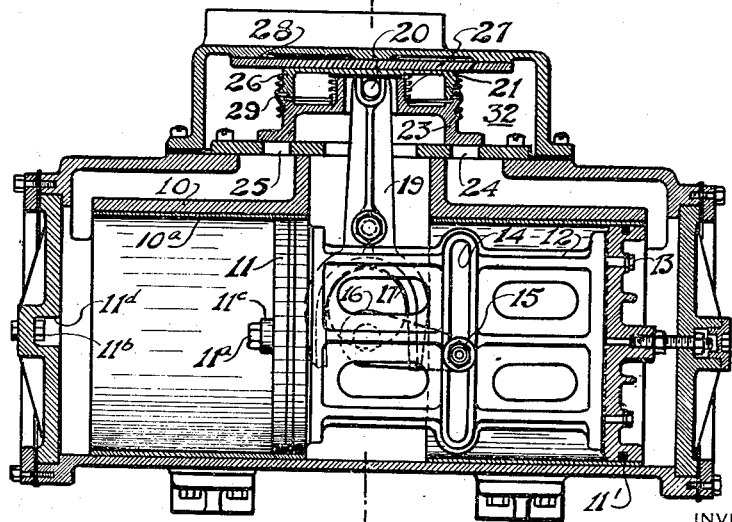
Figure 3:
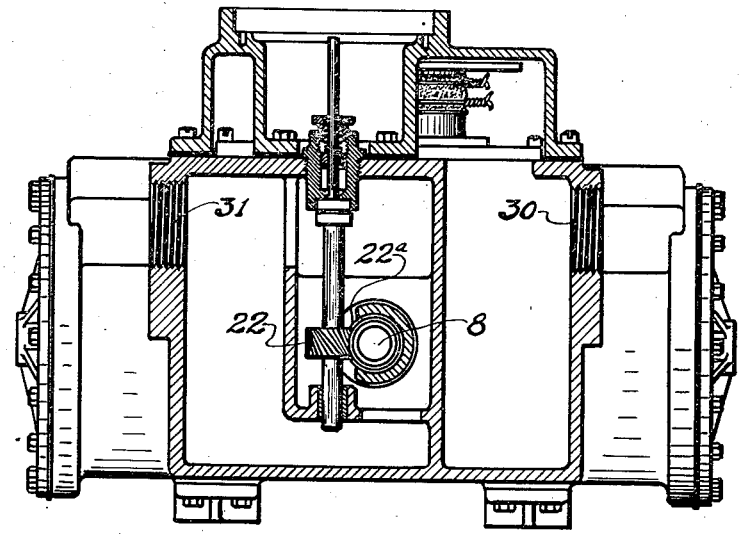

These and other objects of the invention will become more apparent from a consideration of the accompanying drawings constituting a part thereof in which like reference characters designate like parts and in which:

Figure 1 is a cross-sectional view of a fluid meter embodying the principles of this invention;

Figure 2 a cross-sectional view taken along the lines II—II of Figure 1;

Figure 3 a cross-section taken along the lines III—III of Figure 1; and

Figure 4:
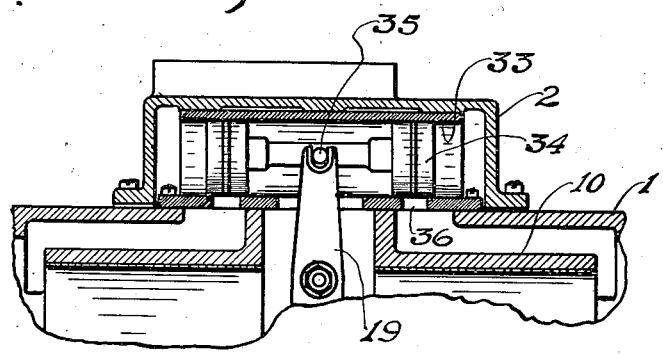

Figure 4 a cross-sectional view of a modified form of valve.

With reference to Figures 1 to 3 inclusive of the drawings, the structure therein illustrated comprises a meter housing 1 having a hollow casting 2 secured thereto by bolts 3, the casting constituting a valve chest or compartment and having a central cored out portion 4 through which a meter shaft 5 projects for connecting the meter with a registering or indicating mechanism (not shown).

The housing 1 is provided with a web portion 6 integrally formed therewith which is bored out for receiving a sleeve 7 in which is mounted a crank shaft 8 journalled by anti-friction bearings 9. The interior of the housing 1 is provided with a plurality of cylinders 10, there being four cylinders arranged in pairs with their axes in parallel relation for receiving a plurality of piston members 11, there being a pair of such pistons in each of the cylinder bores, each pair of pistons being joined by a yoke 12 to which they are secured by cap bolts 13.

The yokes 12 are provided with elongated slots 14 in which a crank pin 15 is disposed for movement, the pin moving back and forth axially in the slot 14 in response to movement of the piston members 11 as will be hereinafter explained in connection with the description of the operation of the meter. The cylinders 10 are preferably provided with liners 10a of a non-corroding metal such as brass or stainless steel, and the piston elements 11 are provided with metal packing rings 11'.

The parallel pistons 11 are connected through their yokes 12 by a plurality of cranks 16, Figures 1 and 2, the cranks being actuated through the crank pins 15 operating in the slots 14. Cranks 16 are provided with integral eccentrics 17 which cooperate with yokes 18 of levers 19 that extend upwardly into the valve chamber and engage connecting pins 20 of valves 21. The cranks 16 are connected to the ends of the shaft 8 which carries a gear wheel 22 to rotate the meter shaft 5.

Pistons 11 are provided with extensions 11a which constitute abutments that engage stops 11b in cylindrical recesses which determine the length of the piston stroke independently of the connected crank mechanism. Sufficient clearance is provided for the crank pin connection with the yokes to permit full length of travel of pistons. Stop 11a is provided with a cylindrical portion 11c that enters cylindrical recess 11d to provide a dash-pot effect which prevents jarring of pistons 11 at end of stroke.

In Figures 1 and 2 of the drawings, the valves 21 are illustrated as slide valves consisting of a lower part 23 which controls valve passages 24 and 25 that communicate with the cylinder chambers 10, and an upper portion 26 which is biased by a coil spring 27 to hold it in contact with a slide or pressure plate 28.

A sealing annulus 29 is fitted into grooves 29a provided in the members 23 and 26 to prevent the fluid of the valve chamber entering between the two halves 23 and 26 of the slide valve.

With reference to Figure 3 of the drawings, the reference numeral 30 designates the inlet flow connection for the meter, and 31 the delivery connection, inlet 30 communicating with valve chamber 32, Figure 2, and the delivery passage 31 communicating with the portion of the chamber of cylinders 10 between the piston element 11 and all of the interior in which the lever 19 is disposed including the discharge side of the valve 21.

It is to be noted that all of the linkage connecting the valve 21 with the measuring pistons 11 is disposed on the discharge side of the meter so that no parts are provided on the pressure side which would necessitate a more complex construction and require the use of fluid packing as in the prior art devices.

In Figure 4 of the drawings, a piston valve is shown in place of the slide valve 21 which operates in precisely the same manner as the slide valve of Figures 1 to 3, the piston valve being preferred where fluid is measured under relatively high pressures as such a valve will be pressure balanced on all sides resulting in lesser wear and longer life of the parts.

The piston type of valve comprises a cylindrical form of valve chamber 33 in which is disposed the piston 34 having a pin connection 35 with the lever 19, the same as the slide valve of Figure 2 of the drawings, and the flow passages 36 are the equivalent of passages 24 and 25 establishing communication with the measuring cylinders and the delivery chamber of the meter.

The above described mechanism operates briefly as follows: With the inlet 30 of the meter connected to a pumping system or other source of fluid pressure and with valve 21 positioned in such manner as to partly open the fluid passage 24, the fluid will flow to the front of one of the piston elements 11 causing its displacement into cylinder 10, and any fluid in the cylinder chamber of the complementary piston element will be displaced through the valve passage 25 to the interior or delivery side of valve 21 from which it passes through the discharge opening 31 to a service line or container. While the piston 11 is moving longitudinally in cylinder chambers 10, the crank pin 15 will be subjected to angular movement through its engagement with the slots 14 of the yoke and cause shaft 8 to be rotated simultaneously with the movement of crank 16. The eccentrics 17 will actuate levers 19 to cause a corresponding movement of the valves 21 in positive timed relation with the movement of the piston element so that when the piston has traversed one half of its stroke, the valve passages 24 and 25 will be wide open causing a maximum flow of the fluid to and from the meter. The pin and slot engagement between valve and pistons permit seating of the piston against the abutting stops 11b before movement of the valve 21 is interrupted.

As shown in Figure 1 of the drawings, cranks 16 are 90° apart so that when one set of pistons is on dead center as shown in Figure 2, the other set is operative to cause rotation of the cranks and consequently the connected valve mechanism whereby a substantially uniform volume of fluid passes through the meter at all times.

The construction of the movable parts is such that minium wear will result from the operation of the device as all of the movable elements are designed to have maximum contacting surfaces whereby a minimum amount of strain is concentrated thereon.

As previously explained, the valve chamber is connected to the inlet connection 30 so that it is at all times filled with fluid under pressure and the pressure acting all around the valve 21 will not cause any excess pressure on any of its contacting sides which in prior art devices resulted in excessive wear.

With the employment of the piston valve disclosed in Figure 4, the valve is uniformly balanced in the fluid which is desirable where fluids are measured under high pressures such as in bulk meters.

As the piston elements 11 are actuated back and forth through operation of the valves 21, the meter shaft 5 is actuated through crank shaft 8 by the connecting gears 22, and as the meter shaft is connected to a register or indicating mechanism (not shown) the amount of fluid displaced by pistons 11 will be registered by such mechanism.

It is evident from the foregoing description of the invention that a meter of the character therein described is of rugged mechanical construction, embodies a minimum number of mechanical parts, and is positive in its operation particularly in maintaining accurate timing of the valve with the piston movement. Also, by operating the valve mechanism through linkage disposed in the discharge pressure side of the system, leakage resulting from packings and connections employed in prior art devices are eliminated thus making the metering device more accurate and useful.

While the invention has been described as embodied in a liquid meter, it is, of course, obvious that it may be utilized for any purpose where it is desirable to produce a timed movement between piston elements or other actuating part and a valve mechanism, as for example in steam engines or the like.

Although one embodiment of the invention has been herein illustrated and described, it will be obvious to those skilled in the art that various modifications may be made in the details of construction without departing from the principles herein set forth.

I claim:

1. A meter for measuring fluids comprising a plurality of cylinder chambers having a valve chamber with valve passages in communication therewith and having stop abutments in axial alinement, a piston element comprising two pistons joined by a slotted yoke, said pistons being movable in said cylinders between said abutments, a valve controlling the flow of fluid through said valve passages operable to cause the flow of fluid from a pressure source to one side of the piston element while permitting the discharge of fluid from the other side of said piston element to a discharge chamber, actuating mechanism for said valve connected to said piston element, said mechanism comprising a rocking lever, an eccentric in cooperative engagement therewith, and a crank shaft having a crank for actuating said eccentric, said crank having a lost motion connection with the piston element consisting of a pin operatively disposed in said slot provided in said piston element whereby said lever is oscillated in response to movement of said pistons in their cylinders and the pistons abut the stops while the valve continues to move.

2. A metering device for measuring fluids comprising a plurality of cylinders having their axes disposed in parallel relation and having each a piston member disposed therein, said members comprising each a pair of pistons joined by yokes to render them simultaneously movable in pairs, adjustable abutments for said pistons, valves controlling the flow of fluid to and from said piston cylinders, and actuating mechanism for said valves comprising levers having pivotal engagement with the valves and being disposed within the delivery chamber of said meter, eccentrics for actuating said levers, a crank shaft for actuating said levers having said eccentrics mounted thereon and having cranks provided with pins disposed for movement in transverse slots provided in said piston yokes, whereby, upon reciprocating movement of said pistons, the cranks are subjected to angular movement causing said eccentrics to actuate the levers to operate the valves in timed relation with the movements of said piston members and so that the flow control valves are movable after a pair of pistons, whose operations they respectively control, are resting against their abutments.

3. A metering device for measuring fluids comprising a housing having a plurality of cylinders with their axes in parallel relation and a plurality of piston members disposed in spaced relation within said cylinders, yokes connecting said piston members, a shaft disposed between said cylinders, cranks connecting said yokes and shaft, said shaft having eccentrics thereon, a plurality of valves controlling the flow of fluid to and from said cylinders, top and bottom guides for said valves, levers connecting said valves and engaging the eccentrics of said cranks, a meter shaft disposed with its axes at right angles to said crank shaft and having gear tooth connection therewith, said valves being constructed to maintain contact at their top and bottom with said guides and being subjected to equal pressures on the sides thereof.

4. A metering device for measuring fluids comprising a plurality of cylinders having piston members operatively disposed therein and having piston valves cooperating with said cylinders to control the flow of fluid through the meter, operating mechanism for rendering said piston valves operative in response to reciprocating movement of the pistons in said cylinders comprising rocker arms, a crank shaft having eccentrics engaging said arms and having cranks engaging the measuring pistons, said valves controlling the flow of fluid through the fluid passages in timed relation with the movement of the pistons in the measuring cylinders and being exposed to fluid pressure at their ends only.

5. A metering device for measuring fluids, comprising a plurality of parallel measuring cylinders having each a piston disposed therein, spacing members for said pistons providing a space between the heads of said pistons and having slots therein, valves controlling the flow passages to and from said measuring cylinders, levers connected to said valves, a crank shaft having a plurality of cranks and having eccentrics for engaging said levers, and crank pins for said cranks disposed in the slots of the piston spacing members, said crank pin connections being provided with clearance to permit full length of travel of the piston elements in their cylinders without interference by the valve actuating mechanism, and said valve actuating mechanism including the lever, eccentric, cranks and pins, being wholly disposed within the space between the piston heads.

6. A fluid measuring meter comprising a meter housing having pairs of cylinders with their axes in parallel spaced relation, a valve housing mounted on said meter housing and communicating therewith, a central web integral with the meter housing extending vertically downward into the housing, a sleeve mounted in said web for supporting anti-friction bearings, a crank shaft disposed through said sleeve and mounted in said bearings, a plurality of eccentrics mounted on said shaft, rocker arms engaged by the eccentrics and extending into the valve housing, valves connected to the rocker arms, pistons in the meter housing loosely connected to the cranks of said crank shaft and a counter shaft geared to said crank shaft to be operative in response to movement of the pistons, said meter housing having its cylinders open at both ends and communicating in pairs, an inlet passage for the flow of fluid to the valve housing, and an outlet passage from the valve housing to the chamber between each pair of pistons.

LYON McCANDLESS.